(12) United States Patent
Shi et al.

(10) Patent No.: US 11,132,844 B2
(45) Date of Patent: Sep. 28, 2021

(54) DRIVING METHOD AND DRIVING APPARATUS FOR AR/VR DISPLAY DEVICE, AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Lingyun Shi, Beijing (CN); Ming Chen, Beijing (CN); Guangquan Wang, Beijing (CN); Hao Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/399,550

(22) Filed: Apr. 30, 2019

(65) Prior Publication Data
US 2020/0105062 A1    Apr. 2, 2020

(30) Foreign Application Priority Data
Sep. 27, 2018    (CN) .......................... 201811136917.9

(51) Int. Cl.
*G06T 19/00* (2011.01)
*G09G 3/36* (2006.01)
(Continued)

(52) U.S. Cl.
CPC ......... *G06T 19/006* (2013.01); *G09G 3/3674* (2013.01); *G09G 3/3685* (2013.01); *G09G 2310/027* (2013.01); *G09G 2310/08* (2013.01)

(58) Field of Classification Search
CPC ............ G06T 19/006; G09G 2310/027; G09G 2310/08; G09G 3/3674; G09G 3/3685
See application file for complete search history.

(56) References Cited

U.S. PATENT DOCUMENTS

| 6,026,196 A  * | 2/2000 | Shannon | G06T 9/00 358/3.14 |
| 10,565,941 B1 * | 2/2020 | Richards | G02B 30/22 |

(Continued)

FOREIGN PATENT DOCUMENTS

| CN | 1797527 A | 7/2006 |
| CN | 1797529 A | 7/2006 |

(Continued)

OTHER PUBLICATIONS

1st Office Action dated Jun. 23, 2020 for Chinese Patent Application No. 201811136917.9.

(Continued)

*Primary Examiner* — Sing-Wai Wu
(74) *Attorney, Agent, or Firm* — Thomas | Horstemeyer, LLP

(57) ABSTRACT

A driving method for an AR/VR display device includes inserting a pre-configuration time period every time a backlight insertion stage is initiated. The driving method includes during the pre-configuration time period, configuring a pre-configuration screen for partial or full-screen pixel lines. The pre-configuration screen includes a black screen, a white screen, or a grayscale screen.

12 Claims, 4 Drawing Sheets inserting a pre-configuration time period every time a backlight insertion stage is initiated — S10 during the pre-configuration time period, configuring a pre-configuration screen for partial or full-screen pixel lines, and the pre-configuration screen includes a black screen, a white screen, or a grayscale screen — S20

(51) Int. Cl.
    *G06F 3/147*    (2006.01)
    *G09G 3/34*     (2006.01)

(56) References Cited

U.S. PATENT DOCUMENTS

| | | | |
|---|---|---|---|
| 2006/0132409 A1* | 6/2006 | Chen | G09G 3/3648 |
| | | | 345/89 |
| 2006/0139302 A1* | 6/2006 | Chen | G09G 3/3648 |
| | | | 345/102 |
| 2008/0074371 A1 | 3/2008 | Tajiri | |
| 2008/0165108 A1 | 7/2008 | Shen et al. | |
| 2009/0121994 A1* | 5/2009 | Miyata | G09G 3/3648 |
| | | | 345/89 |
| 2016/0125786 A1* | 5/2016 | Lai | G09G 3/003 |
| | | | 345/691 |
| 2017/0309233 A1* | 10/2017 | Patel | G02F 1/133603 |

FOREIGN PATENT DOCUMENTS

| | | |
|---|---|---|
| CN | 101162302 | 4/2008 |
| CN | 101546540 | 9/2009 |
| CN | 105549205 | 5/2016 |
| CN | 106205497 | 12/2016 |
| CN | 106981272 | 7/2017 |
| TW | I265340 | 11/2006 |

OTHER PUBLICATIONS

Third Office Action for CN Patent Application No. 201811136917.9 dated Jul. 30, 2021.

* cited by examiner

| | Previous Frame | | | | | | | | | | | | | | | | |
|---|---|---|---|---|---|---|---|---|---|---|---|---|---|---|---|---|---|
| | | 0 | 16 | 32 | 48 | 64 | 80 | 96 | 112 | 128 | 144 | 160 | 176 | 192 | 208 | 224 | 240 | 255 |
| Current Frame | 0 | 0 | 0 | 0 | 0 | 0 | 0 | 0 | 0 | 0 | 0 | 0 | 0 | 0 | 0 | 0 | 0 | 0 |
| | 16 | 18 | 16 | 14 | 12 | 10 | 6 | 5 | 1 | 0 | 0 | 0 | 0 | 0 | 0 | 0 | 0 | 0 |
| | 32 | 37 | 35 | 32 | 30 | 27 | 24 | 22 | 20 | 16 | 13 | 10 | 5 | 2 | 0 | 0 | 0 | 0 |
| | 48 | 58 | 53 | 50 | 48 | 45 | 42 | 40 | 38 | 34 | 31 | 27 | 23 | 19 | 13 | 6 | 3 | 1 |
| | 64 | 81 | 73 | 69 | 66 | 64 | 61 | 58 | 56 | 54 | 50 | 45 | 41 | 37 | 31 | 23 | 19 | 16 |
| | 80 | 105 | 98 | 92 | 89 | 83 | 80 | 77 | 74 | 72 | 65 | 61 | 56 | 52 | 46 | 37 | 32 | 32 |
| | 96 | 126 | 118 | 113 | 109 | 104 | 99 | 96 | 92 | 90 | 83 | 79 | 73 | 68 | 60 | 53 | 48 | 48 |
| | 112 | 144 | 140 | 134 | 129 | 124 | 120 | 115 | 112 | 108 | 106 | 98 | 93 | 86 | 77 | 68 | 64 | 64 |
| | 128 | 161 | 160 | 156 | 151 | 146 | 141 | 137 | 131 | 128 | 124 | 118 | 113 | 106 | 96 | 86 | 80 | 80 |
| | 144 | 179 | 176 | 176 | 172 | 167 | 163 | 158 | 153 | 149 | 144 | 140 | 136 | 126 | 118 | 105 | 96 | 96 |
| | 160 | 195 | 192 | 192 | 190 | 186 | 182 | 178 | 174 | 169 | 165 | 160 | 154 | 147 | 138 | 124 | 112 | 112 |
| | 176 | 208 | 208 | 207 | 205 | 202 | 199 | 196 | 193 | 188 | 185 | 180 | 176 | 169 | 161 | 147 | 133 | 128 |
| | 192 | 224 | 223 | 221 | 218 | 216 | 214 | 211 | 209 | 206 | 203 | 200 | 196 | 192 | 186 | 172 | 160 | 160 |
| | 208 | 240 | 238 | 236 | 234 | 232 | 231 | 229 | 227 | 224 | 222 | 220 | 217 | 213 | 208 | 202 | 193 | 179 |
| | 224 | 248 | 248 | 247 | 247 | 246 | 245 | 244 | 243 | 242 | 241 | 239 | 237 | 234 | 229 | 224 | 217 | 209 |
| | 240 | 253 | 251 | 251 | 251 | 251 | 251 | 251 | 251 | 251 | 251 | 251 | 248 | 248 | 248 | 248 | 240 | 234 |
| | 255 | 255 | 255 | 255 | 255 | 255 | 255 | 255 | 255 | 255 | 255 | 255 | 255 | 255 | 255 | 255 | 255 | 255 |

FIG. 5

| | OD LUT | |
|---|---|---|
| | Origin | OD |
| Current Frame | 0 | 0 |
| | 16 | 18 |
| | 32 | 37 |
| | 48 | 58 |
| | 64 | 81 |
| | 80 | 105 |
| | 96 | 126 |
| | 112 | 144 |
| | 128 | 161 |
| | 144 | 179 |
| | 160 | 195 |
| | 176 | 208 |
| | 192 | 224 |
| | 208 | 240 |
| | 224 | 248 |
| | 240 | 253 |
| | 255 | 255 |

FIG. 6

DRIVING METHOD AND DRIVING APPARATUS FOR AR/VR DISPLAY DEVICE, AND DISPLAY DEVICE

CROSS-REFERENCE TO RELATED APPLICATIONS

The present application claims priority to Chinese Patent Application No. 201811136917.9 and filed Sep. 27, 2018, the entire contents of which are incorporated herein by reference.

TECHNICAL FIELD

The present disclosure generally relates to the field of display, and in particular, to a driving method and a driving apparatus for an AR/VR display device, and a display device.

BACKGROUND

VR systems are commonly used in fields such as games and video playback, and frequently switch scenes. To increase visual fluency for the user, the display refresh rate is usually greater than 90 Hz. Since the liquid crystal response takes several milliseconds, a smear phenomenon caused by unsatisfactory liquid crystal response may occur when scenes are switched at a high speed, which may seriously affect the VR user experience. At present, a method of turning off the backlight when the liquid crystal response is operating, and turning on the backlight after the end of the response seems very effective. This method is referred to as backlight black insertion.

At present, in a normal VR display system, the movement of the human head and the rotation of the eyeballs may be not matching with the images entering the human eyes, which may cause discomfort. Therefore, fast follow-up and response time are critical for VR display. The gray-to-gray (GTG) response time is rather slow and has become the bottleneck of response time.

SUMMARY

The present disclosure provides a driving method and a driving apparatus for an AR/VR display device, and a display device.

In a first aspect, a driving method for an AR/VR display device is provided. The method includes inserting a pre-configuration time period every time a backlight insertion stage is initiated. The method includes during the pre-configuration time period, configuring a pre-configuration screen for partial or full-screen pixel lines. The pre-configuration screen includes a black screen, a white screen, or a grayscale screen.

In a second aspect, a driving apparatus for an AR/VR display device is provided. The driving apparatus includes a pre-configuration module. The pre-configuration module is configured to, under an action of a pre-configuration clock signal, output a driving signal to a corresponding pixel line. The pre-configuration clock signal is valid for a pre-configuration time period inserted every time a backlight insertion stage is initiated.

In a third aspect, an AR/VR display device is provided. The AR/VR display device includes a plurality of pixels arranged in a plurality of regions divided by a plurality of scan lines and a plurality of data lines. The AR/VR display device includes a scan driving circuit including at least two or more cascaded scan driving modules. The scan driving module of each pre-configured pixel line is configured to scan corresponding pixels simultaneously under an action of a pre-configuration clock signal. The AR/VR display device includes a data driving circuit including at least two or more data driving modules. The data driving modules are configured to respectively provide display data for displaying the pre-configured screen to the pre-configured pixel lines.

BRIEF DESCRIPTION OF THE DRAWINGS

FIG. 5 illustrates an exemplary schematic diagram of a lookup table LUT according to an arrangement of the present disclosure;

FIG. 6 shows an exemplary schematic diagram of a lookup table LUT after pre-configuration according to an arrangement of the present disclosure;

DETAILED DESCRIPTION

Figure 1:
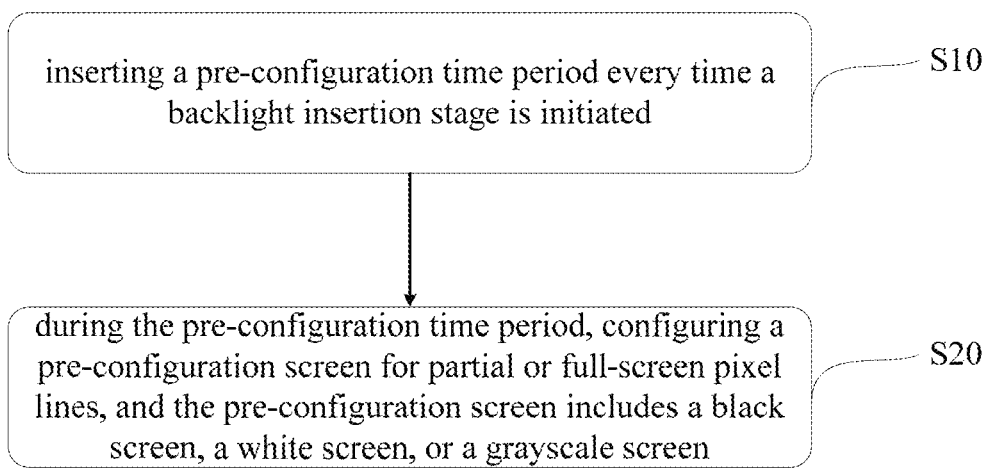
FIG. 1 illustrates an exemplary flowchart of a driving method for an AR/VR display device according to an arrangement of the present application.

The present disclosure will be further described in detail below with reference to the accompanying drawings and arrangements. It is understood that the specific arrangements described herein are merely illustrative of the present disclosure, rather than limiting the present disclosure. It should also be noted that, for the convenience of description, only parts related to the present disclosure are shown in the drawings.

It should be noted that the arrangements in the present disclosure and the features in the arrangements may be combined with each other without conflict. The present disclosure will be described in detail below with reference to the accompanying drawings.

Referring to FIG. 1, FIG. 1 illustrates an exemplary flowchart of a driving method for an AR/VR display device according to an arrangement of the present disclosure. As shown, the driving method includes the following blocks.

In block S10, a pre-configuration time period is inserted every time a backlight insertion stage is initiated.

In block S20, during the pre-configuration time period, a pre-configuration screen is configured for partial or full-screen pixel lines, and the pre-configuration screen includes a black screen, a white screen, or a grayscale screen.

In the field of liquid crystal display, the response time of liquid crystals from one grayscale to another grayscale (Gray to Gray) is much slower than the response time of liquid crystals from a grayscale to a white (L255) screen, a grayscale to a black (L0) screen, a white (L255) screen to a grayscale, a black (L0) screen to a grayscale, a white (L255) screen to a black (L0) screen, a black (L0) screen to a white (L255) screen, and Gray to Gray has become the bottleneck of reduction of the response time.

Based on the above characteristics, in the present disclosure, the Gray to Gray process of the liquid crystals is converted into a process of driving from a pre-configuration screen to L255 or L0, and then from L255 or L0 to the target grayscale, so as to reduce the response time. Therefore, a pre-configuration time period is inserted during the black insertion stage to configure the liquid crystals from the grayscale to L255 or L0. It should be noted that it can also be pre-configured to a designated grayscale. For convenience of description, in the present disclosure, the process of configuring the pixels of the display screen to a preset screen before the target screen is displayed is referred to as a pre-configuration time period, and the designated screen is referred to as a pre-configuration screen.

In some arrangements, inserting a pre-configuration time period when a backlight insertion stage is initiated includes for pre-configuration of partial or full-screen pixel lines, inserting the pre-configuration time period before the backlight insertion stage is initiated and the successive scanning is initiated.

Figure 2:
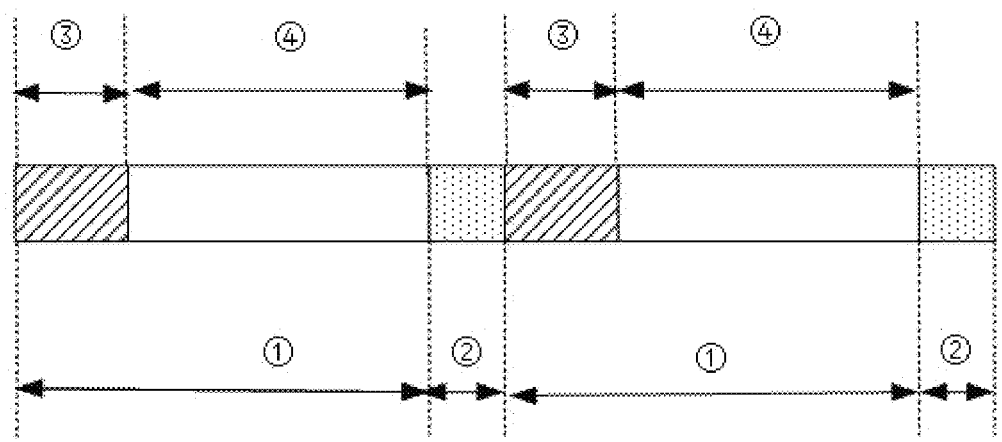
FIG. 2 illustrates an exemplary schematic diagram of a backlight black insertion timing sequence according to an arrangement of the present disclosure.

FIG. 2 illustrates an exemplary schematic diagram of a backlight black insertion timing sequence according to an arrangement of the present disclosure. As shown, the display process of one frame includes a backlight insertion stage 1 and a backlight tuned on stage 2. The existing backlight black insertion is to perform progressive scanning of pixels in the black backlight insertion stage, and the backlight is turned on after the liquid crystal response finishes. In the present disclosure, the backlight black insertion stage of includes a pre-configuration time period 3 and a scanning time period 4, and the pre-configuration time period is before the scanning, during which pre-configuration scanning is performed for partial or full-screen pixel lines.

In some arrangements, inserting a pre-configuration time period when a backlight insertion stage is initiated includes for pre-configuration of partial-screen pixel lines, inserting the pre-configuration time period when the backlight insertion stage is initiated and the progressive scanning is initiated, wherein the partial-screen pixels belong to pixels scanned in a later time.

Figure 3:
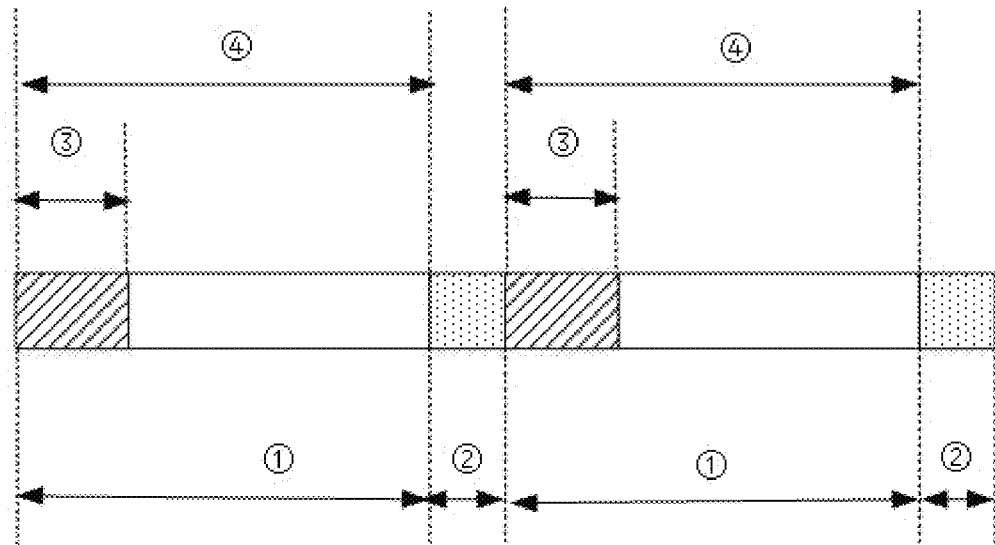
FIG. 3 illustrates an exemplary schematic diagram of another backlight black insertion timing sequence according to an arrangement of the present disclosure.

FIG. 3 illustrates an exemplary schematic diagram of another backlight black insertion timing sequence according to an arrangement of the present disclosure. As shown, a displaying process of a frame of screen includes a backlight insertion stage 1 and a backlight tuned on stage 2. In the arrangement, the backlight insertion stage includes a pre-configuration time period 3 and a scanning time period 4, and the pre-configuration time period 3. The scanning time period 4 are temporally multiplexed. That is, the scanning is initiated while the pre-configuration is initiated. This pre-configuration method is applicable to pre-configuration for a partial screen. That is, some pixel lines are pre-configured and then scanned to the target screen, and another part is directly scanned to the target screen. Specifically, according to the resolution of the screen, the number of pixel lines, and the liquid crystal response characteristic, partial screen pre-configuration to a black screen, a white screen, or a grayscale screen is initiated at the k-th (k<n) line of the pixels of a total n rows. In this way, it can realize multiplexing the time for pre-configuration from the k-th line to the n-th line and the time for liquid crystal scanning of the previous k-1 lines to the target screen, and reduce the full screen response time. The value of the k depends on the liquid crystal response time and scanning time of each grayscale to a black screen, a white screen or a grayscale screen, to ensure that when scanning of the k-th line to the target screen is initiated, the pre-configuration for the k-th line to the n-th line finishes.

Figure 4:
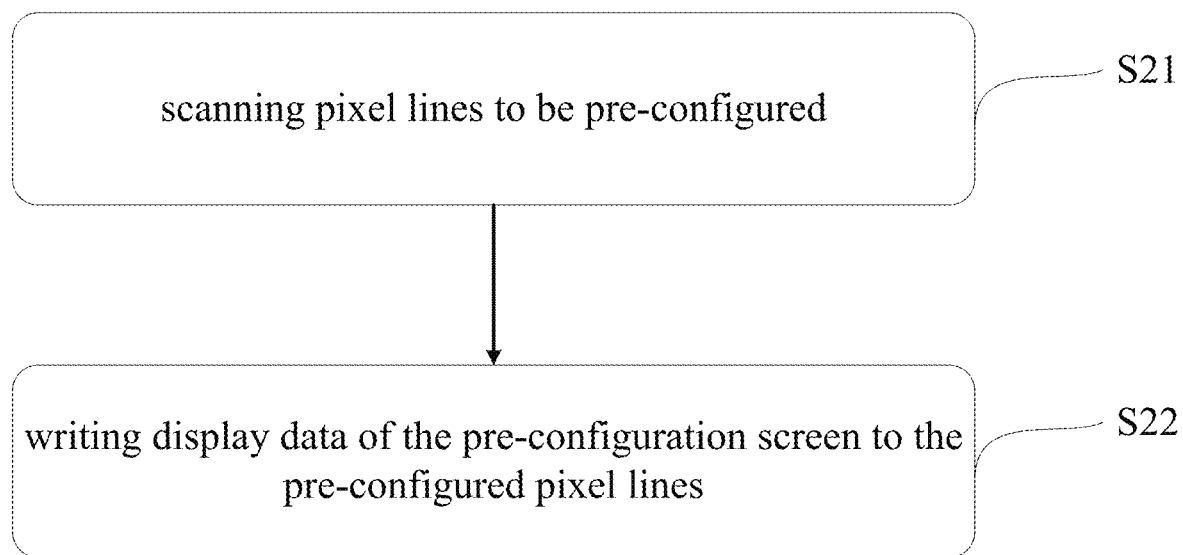
FIG. 4 shows an exemplary flow chart of block S20 according to an arrangement of the present disclosure.

FIG. 4 shows an exemplary flow chart of block S20 according to an arrangement of the present disclosure. As shown, in some arrangements, block S20 includes the following blocks.

In block S21, pixel lines to be pre-configured are scanned.

In block S22, display data of the pre-configuration screen is provided to the pre-configured pixel lines.

In the block S21, during the pre-configuration time period, the display data input to the pixel lines to be pre-configured is the same. Therefore, the pixel lines may be scanned simultaneously, and corresponding display data may be written into the pre-configured pixel lines simultaneously. Alternatively, the display data of the pre-configuration screen may be written in a progressive scanning mode.

In the block S22, designated display data is input to the pre-configured pixel lines after the pre-configured pixel lines are scanned, to configure the pixel lines to a white screen or a black screen.

The pre-configuration method of the present disclosure can also be applied to the Over Driving (OD) display field. OD is to apply an overdrive grayscale voltage (OD voltage) that is higher or lower than a target grayscale voltage for pixels of a certain grayscale to be switched to the next frame, so that the liquid crystal is deflected more quickly when deflected to the target grayscale angle, and the backlight is turned on to display the target grayscale. In order to obtain an accurate OD voltage, the target grayscale of the current frame has to be compared with the grayscale of the previous frame, and an OD lookup table (LUT) is obtained by testing the display screen, through which an OD voltage corresponding to switching from the current grayscale to the target grayscale may be obtained. FIG. 5 illustrates an exemplary schematic diagram of a lookup table LUT according to an arrangement of the present disclosure. Since for different areas of the display screen, the time periods from the end of the scanning to the turning on of the backlight are different, and for different temperatures, the grayscale differences are also different, it requires the IC to store enormous LUTs and frame images, which takes up a lot of storage space and power consumption.

An example of reducing the response time in conjunction with the pre-configuration scheme of the present disclosure in the OD display scenario is given below. If the pre-configuration partial screen is a black screen, the pre-configuration time period is inserted when the backlight insertion stage is initiated and the successive scanning is initiated. Thereafter, when the target display data is written after the pre-configuration time period, the grayscale voltage data higher than the target grayscale voltage or lower than the target grayscale voltage is written to the pre-configures pixel lines. In the scanning from the black screen to the target screen, only lookup table data for the previous frame being a black screen is needed. As shown in FIG. 6, FIG. 6 shows an exemplary schematic diagram of a lookup table LUT after pre-configuration according to an arrangement of the present disclosure. After pre-configuration, it is not necessary to compare with the grayscale displayed in the previous frame, which can greatly reduce the storage space and power consumption. For example, for pixels of the second half of the screen, the response time is tight, and the pixels can be firstly charged to L255, L0 or any designated grayscale, and then charged to the target grayscale from L255, L0 or any designated grayscale under overvoltage driving. This can reduce response time, simplify lookup table LUTs, and save storage space.

It should be noted that, in the OD display scenario, the pre-configuration time period can also be inserted before the backlight insertion stage is initiated and the successive scanning is initiated. And when the target display data is written after the pre-configuration, the gray-scale overvoltage driving is adopted. That is, grayscale voltage data that is higher than the target grayscale voltage or lower than the target grayscale voltage is written to the pre-configured pixel lines.

Figure 7:
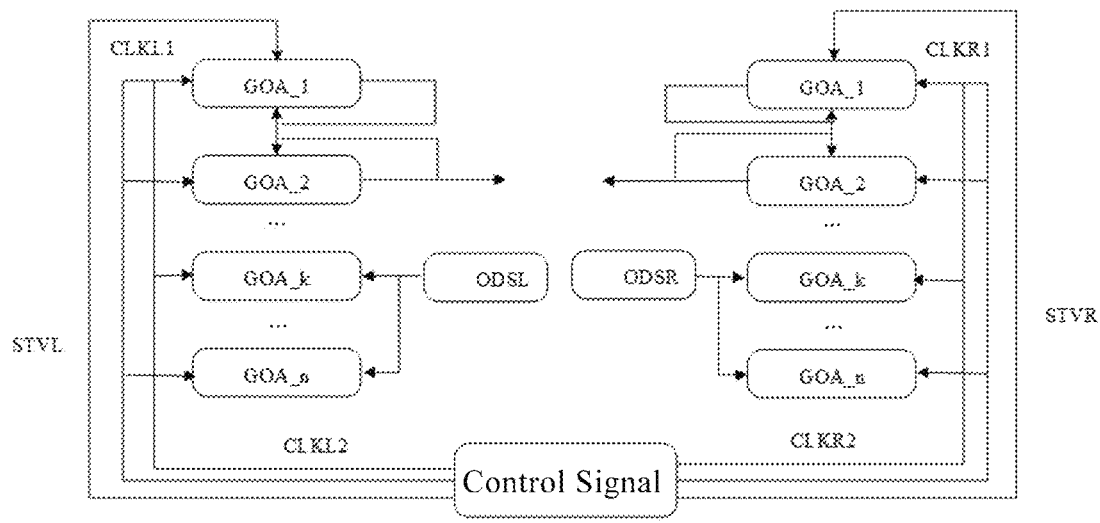
FIG. 7 shows an exemplary structural block diagram of an OD driving circuit according to an arrangement of the present disclosure.

A circuit of the above arrangement may refer to FIG. 7, and FIG. 7 shows an exemplary structural block diagram of an OD driving circuit according to an arrangement of the present disclosure. In the actual AR/VR display, on the basis of the existing GOA (Gate ON Array) circuit design, an ODS signal can be added to the pixel line that needs be OD overcharged. For the bilateral GOA, ODSL(left) and ODSR (right) signals need to be added, and the Gate output signal is pulled to the required voltage (Gate turned on voltage). In this arrangement, the pre-configuration can be implemented by controlling the ODSL and ODSR signals. Since the pre-configuration display data is the same, the display data can be simultaneously written to the pixel lines to be pre-configured through the ODSL and ODSR signals. Specifically, the driving circuits GOA_k to GOA_n of the k-th line to the n-th line of pixels are gated by the ODSL and ODSR signals, and the corresponding display data is written. Only an example of transmitting a pre-configuration signal to a part of the driving circuit through the ODS signal line is shown. In practice, independent pre-configuration signal lines can also be used for pre-configuration, which is beneficial for separate control of pre-configuration and OD drive.

The disclosure also provides a driving apparatus for an AR/VR display device.

Figure 8:
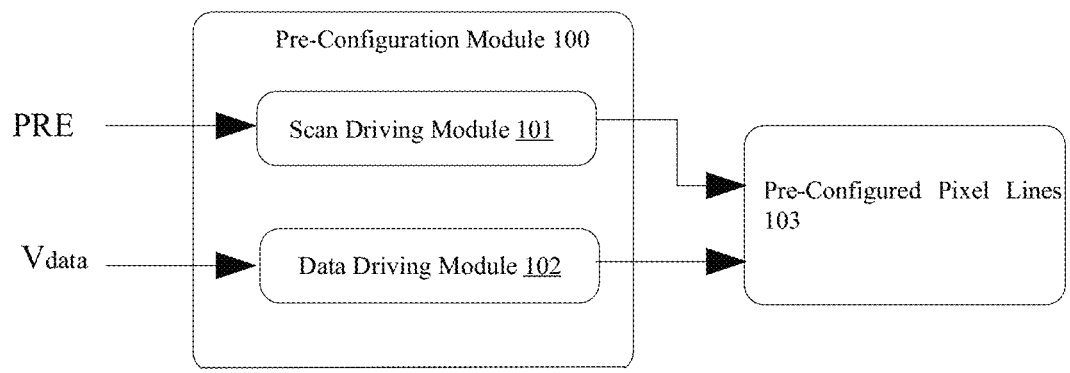
FIG. 8 shows an exemplary structural block diagram of a pre-configuration module according to an arrangement of the present disclosure.

FIG. 8 shows an exemplary structural block diagram of a pre-configuration module an AR/VR display device according to an arrangement of the present disclosure. As shown, the driving apparatus for an AR/VR display device includes a pre-configuration module 100.

The pre-configuration module 100, under an action of a pre-configuration clock signal PRE, outputs a driving signal to a corresponding pixel line.

The pre-configuration clock signal PRE is valid for a pre-configuration time period inserted every time a backlight insertion stage is initiated.

The working principle of the pre-configuration module may refer to the description of FIG. 1.

In some arrangements, for pre-configuration of partial or full-screen pixel lines, the pre-configuration time period is inserted before the backlight insertion stage is initiated and the successive scanning is initiated.

In some arrangements, for pre-configuration of partial-screen pixel lines, the pre-configuration time period is inserted when the backlight insertion stage is initiated and the progressive scanning is initiated, and the partial-screen pixel lines are pixel lines scanned and driven in a later time.

In some arrangements, the pre-configuration module 100 includes a scan driving module 101 and a data driving module 102.

The scan driving module 101 is configured to scan pixel lines to be pre-configured. The scan driving module 101 includes a gate driving circuit.

The data driving module 102 is configured to write display data Vdata of the pre-configuration screen to pre-configured pixel lines 103. The data driving module 102 includes a source driving circuit.

Under the control of a Timing Controller, the gate driving circuit and the source driving circuit starts to perform a pre-configuration.

Specially, the Timing Controller sends a pre-configuration clock signal PRE. According to the pre-configuration clock signal PRE, the gate driving circuit pixel starts to scan pixel lines to be pre-configured. According to the pre-configuration clock signal PRE, the source driving circuit starts to provide pre-configuration screens to the pre-configured pixel lines 103.

In some arrangements, the data driving module also employs grayscale overvoltage driving when the target display data is written after the pre-configuration time period.

The disclosure also provides an AR/VR display device. The AR/VR display device includes a plurality of pixels, and the pixels are arranged in a plurality of regions divided by a plurality of scan lines and a plurality of data lines. The AR/VR display device includes at least one of the driving apparatus for an AR/VR display device provided by the arrangements of the present disclosure.

The above description is only preferred arrangements of the present disclosure and a description of the principles of the applied technology. It should be understood by those skilled in the art that the scope of the present disclosure referred to in the present disclosure is not limited to the specific combination of the above technical features, and should also cover other technical solutions formed by any combination of the above technical features or equivalent features thereof without departing from the inventive concept, for example, technical solutions formed by replacing the above features with (but not limited to) the technical features disclosed in the present disclosure having similar functions, or vice versa.

What is claimed is:

1. A driving method for an augmented reality/virtual reality (AR/VR) display device, comprising:
    inserting a pre-configuration time period when a backlight insertion stage is initiated;
    during the pre-configuration time period, configuring liquid crystals from grayscale to L255, L0, or a designated grayscale;
    during the pre-configuration time period, configuring a pre-configuration screen for partial screen pixel lines by scanning pixel lines to be pre-configured and writing display data of the pre-configuration screen to pre-configured pixel lines, wherein the display data is simultaneously written to the pixel lines to be pre-configured through over driving signal left (ODSL) and over driving signal right (ODSR) signals, the pre-configuration screen comprising a black screen, a white screen, or a grayscale screen, some of the pixel lines being pre-configured and then scanned to a target screen, and other ones of the pixel lines being directly scanned to the target screen; and
    multiplexing time for pre-configuring the some of the pixel lines and time for scanning the other ones of the pixel lines to the target screen.

2. The driving method for the AR/VR display device according to claim 1, wherein inserting the pre-configuration time period when the backlight insertion stage is initiated comprises:

for pre-configuration of the partial screen pixel lines, inserting the pre-configuration time period before the backlight insertion stage is initiated and a successive scanning is initiated.

3. The driving method for the AR/VR display device according to claim 1, wherein inserting the pre-configuration time period when the backlight insertion stage is initiated comprises:
for pre-configuration of the partial screen pixel lines, inserting the pre-configuration time period when the backlight insertion stage is initiated and a progressive scanning is initiated, wherein the partial screen pixel lines are pixel lines scanned in a later time.

4. The driving method for the AR/VR display device according to claim 1, further comprising employing grayscale overvoltage driving when target display data is written after the pre-configuration time period.

5. A driving apparatus for an augmented reality/virtual reality (AR/VR) display device comprising a pre-configuration module, wherein the pre-configuration module is configured to:
during the pre-configuration time period, configure liquid crystals from grayscale to L255, L0, or a designated grayscale;
during the pre-configuration time period, configure a pre-configuration screen for partial screen pixel lines, wherein the pre-configuration screen comprises a black screen, a white screen, or a grayscale screen, some of the pixel lines being pre-configured and then scanned to a target screen, and other ones of the pixel lines being directly scanned to the target screen, wherein time for pre-configuring the some of the pixel lines and time for scanning the other ones of the pixel lines to the target screen are multiplexed, wherein the pre-configuration module comprises a scan driving module and a data driving module, the scan driving module being configured to, under an action of the pre-configuration clock signal, scan pixel lines to be pre-configured, and the data driving module being configured to, under an action of the pre-configuration clock signal, write display data of the pre-configuration screen to pre-configured pixel lines, wherein the display data is simultaneously written to the pixel lines to be pre-configured through over driving signal left (ODSL) and over driving signal right (ODSR) signals; and
under an action of a pre-configuration clock signal, output a driving signal to a corresponding pixel line, wherein the pre-configuration clock signal is valid for a pre-configuration time period inserted every time a backlight insertion stage is initiated.

6. The driving apparatus for the AR/VR display device according to claim 5, wherein the pre-configuration module is further configured to, for pre-configuration of the partial screen pixel lines, the pre-configuration time period is inserted before the backlight insertion stage is initiated and a successive scanning is initiated.

7. The driving apparatus for the AR/VR display device according to claim 6, wherein the driving apparatus is implemented in an AR/VR display device that comprises a plurality of pixels arranged in a plurality of regions divided by a plurality of scan lines and a plurality of data lines.

8. The driving apparatus for the AR/VR display device according to claim 5, wherein:
the pre-configuration module is further configured to, for pre-configuration of the partial screen pixel lines, the pre-configuration time period is inserted when the backlight insertion stage is initiated and a progressive scanning is initiated, and the partial-screen pixel lines are pixel lines scanned and driven at a later time.

9. The driving apparatus for the AR/VR display device according to claim 8, wherein the driving apparatus is implemented in an AR/VR display device that comprises a plurality of pixels arranged in a plurality of regions divided by a plurality of scan lines and a plurality of data lines.

10. The driving apparatus for the AR/VR display device according to claim 5, wherein the data driving module is further configured to employ grayscale overvoltage driving when target display data is written after the pre-configuration time period.

11. The driving apparatus for the AR/VR display device according to claim 10, wherein the driving apparatus is implemented in an AR/VR display device that comprises a plurality of pixels arranged in a plurality of regions divided by a plurality of scan lines and a plurality of data lines.

12. The driving apparatus for the AR/VR display device according to claim 5, wherein the driving apparatus is implemented in an AR/VR display device that comprises a plurality of pixels arranged in a plurality of regions divided by a plurality of scan lines and a plurality of data lines.

* * * * *